United States Patent [19]

Bauer et al.

[11] Patent Number: 4,729,458

[45] Date of Patent: Mar. 8, 1988

[54] FRICTION DAMPER, IN PARTICULAR FOR WASHING MACHINES WITH SPIN CYCLE

[75] Inventors: Hans-Peter Bauer; Hans J. Bauer; Ludwig Stadelmann, all of Altdorf, Fed. Rep. of Germany

[73] Assignee: Fritz Bauer + Söhne oHG, Altdorf, Fed. Rep. of Germany

[21] Appl. No.: 841,682

[22] Filed: Mar. 19, 1986

[30] Foreign Application Priority Data

Mar. 26, 1985 [DE] Fed. Rep. of Germany ... 8508931[U]
Feb. 12, 1986 [DE] Fed. Rep. of Germany ....... 3604286

[51] Int. Cl.$^4$ .............................................. F16F 7/08
[52] U.S. Cl. ..................... 188/129; 24/297; 24/453; 24/573; 68/23.1; 188/271; 188/321.11; 188/322.19; 188/322.22; 403/290
[58] Field of Search ...................... 188/322.19, 322.22, 188/321.11, 129, 271, 274; 403/71, 289, 290; 24/297, 453, 573; 68/23.1

[56] References Cited

U.S. PATENT DOCUMENTS

| 1,490,649 | 4/1924 | Vanderbeek | 403/290 |
| 3,063,114 | 11/1962 | Perrochat | 24/297 |
| 3,193,895 | 7/1965 | Oxley | 24/297 X |
| 3,669,512 | 6/1972 | Parks | 403/290 X |
| 3,679,249 | 7/1972 | Hoffmann | 403/71 X |
| 4,181,337 | 1/1980 | Muller | 403/71 X |
| 4,265,344 | 5/1981 | Taylor | 188/322.19 X |
| 4,375,843 | 3/1983 | Itzinger et al. | 188/322.19 |
| 4,533,126 | 3/1985 | Mueller et al. | 188/129 X |
| 4,579,473 | 4/1986 | Brugger | 403/71 X |

FOREIGN PATENT DOCUMENTS

| 1450932 | 5/1969 | Fed. Rep. of Germany | 24/297 |
| 1187269 | 4/1970 | United Kingdom . | |
| 2006916 | 5/1979 | United Kingdom | 188/321.11 |

Primary Examiner—George E. A. Halvosa
Attorney, Agent, or Firm—Browdy and Neimark

[57] ABSTRACT

A friction damper, especially for washing machines with a spin cycle, consists of a housing (1) having a substantially circular cylindrical inner wall and a tappet (2) that can be pushed coaxially into the housing, extending at one end out of the housing and at the other end being provided with a friction piston. The friction piston is provided with friction elements pressed elastically against the inner wall of the housing (1), and securing elements (4, 8) are formed on the respective ends of the tappet (2) and housing (1). To attain a considerable reduction in the damping forces once there has been a passage through the critical rpm level, the housing (1) is made of plastic.

9 Claims, 8 Drawing Figures

# FRICTION DAMPER, IN PARTICULAR FOR WASHING MACHINES WITH SPIN CYCLE

FIELD OF THE INVENTION

The present invention relates to a friction damper for use especially in washing machines with a spin cycle, consisting of a housing having a substantially circular cylindrical inner wall and a tappet extending at one end out of the housing and at the other end provided with a friction piston. The friction piston is provided with friction elements pressed elastically against the inner wall of the housing, and securing elements are provided on the respective end of the tappet and of the housing.

BACKGROUND OF THE INVENTION

In a friction damper of this kind, known from U.S. patent application Ser. No. 187,186, filed Sept. 15, 1980, now replaced without prejudice by Ser. No. 494,680 filed May 16, 1983 the housing consists of a cylindrical metal tube, while the tappet is in one piece, made of some suitable plastic, such as polyamide. This friction damper has proved itself to be of extraordinarily great utility, primarily in washing machines with a spin cycle.

During normal washing operation, washing machines with a spin cycle are driven at a subcritical rotational speed of the vibrating system of the washing machine. During spinning, the drum of the machine is driven at a supercritical rotational speed; that is, as the machine accelerates up to spinning rpm, the vibrating system passes through the critical rpm level. The wet laundry that is located in the drum after the wash cycle and before the spin cycle represents a considerable eccentricity, resulting in considerable imbalancing forces upon acceleration into the spin cycle speed. During this acceleration, the damper must accordingly effect powerful damping. Since the imbalance decreases sharply as the water is spun out of the drum, and because in any event the vibration amplitudes of the vibrating system decrease sharply in the supercritical rpm range, only limited damping force must be produced once the machine has passed back through the critical rpm level. Hydraulic dampers for this purpose are already known, which enable reducing the hydraulic damping forces toward the end of the spin cycle.

SUMMARY OF THE INVENTION

The present invention is intended to produce such a friction damper in a simple way, such that a considerable reduction in the damping forces is attained once there has been a passage through the critical rpm level.

This object is attained in accordance with the present invention by providing that the housing be made of plastic. Surprisingly, it has been found that, because of the heat produced during acceleration up to the spinning rpm because of the greatly increased friction, the plastic housing increases its inside diameter so much that a considerable drop in friction forces between the tappet and the housing occurs. Thus to a certain, partial extent, a self-cancellation of the damping effect of the friction damper takes place. A residual damping still remains, however, so that the residual damping still required at the end of a spin cycle is still available. The provisions according to the invention even result in simplification of the manufacture of the friction damper, because like the tappet, the housing can be injection molded, and in accordance with a further provision of the invention the entire housing can be integrally injection molded.

In a further feature of the invention, optimal wall thicknesses of the housing are specified, with which the above-described effects according to the invention are brought about. Preferred materials are also specified, with which the effects according to the invention can be particularly favorably attained, while the great strength of the housing remains unchanged.

Embodying the housing according to the invention makes it possible—as noted above—to form even securing elements that are complicated in shape integrally with the housing; this makes for particularly simple assembly of the friction damper, especially in drum-type washing machines.

Further advantages and characteristics of the invention will become apparent from the ensuing detailed description of exemplary embodiments of the present invention, taken in conjunction with the drawings.

DESCRIPTION OF THE PREFERRED EMBODIMENT

Figure 1:
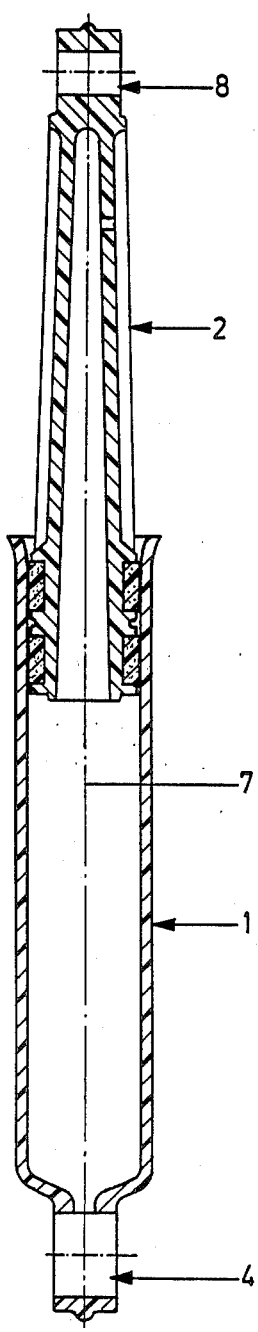
FIG. 1 shows a friction damper according to the present invention, seen in longitudinal section.

The friction damper shown in the drawings consists of a housing 1 and a tappet 2.

The housing 1 consists of a sleeve closed at one end by means of the bottom 3. A so-called eye 4, i.e. an articulated box for linking of the friction damper, has been attached to the outside of the bottom 3. For this reason, the eye 4 has a cylindrical recess 5, the axis of symmetry 6 of which vertically intersects the central longitudinal axis 7 of the friction damper.

Housing 1, bottom 3 and eye 4 are constructed of one piece.

The tappet 2 also has an eye 8 on its outermost end, i.e. it has an articulated box, and has a cylindrical recess 9 the axis 10 of which also vertically intersects the central longitudinal axis 7. The tappet itself mainly consists of a tube 11, tapered in the direction of the eye 8, which is braced on its outside by means of longitudinal ribs 12. The eye 8 is disposed at the outermost end of this tube 11.

The tube 11 has an exhaust opening 13.

A friction piston 14 is disposed on the inner end of the tappet 2, which is inside the housing 1 and has annular bracing flanges 15, 16 and 17, 18, placed apart from each other and disposed in pairs. Between the corresponding bracing flanges 15, 16 and 17, 18 there are disposed generally circular cylindrical seating surfaces 19, 20, also disposed concentrically with respect to the axis 7. On each seating surface 19, 20 there is a respective friction sleeve 21, 22, which is closed at its circumference. These friction sleeves are made of an elastic foamed material with closed pores.

The housing 1, in general in the form of a cylindrical sleeve, has a work area 23, in which the inner wall 24 of the housing 1 is formed, entirely circular cylindrically. On each side of this work area 23, the housing 1 has a respective end area 25, 26, where the inner wall 24 of the housing 1 widens slightly toward the housing opening 27 and away from the bottom 3; this widening is on the order of approximately 10' (i.e. 10 arc-minutes). This change in diameter, not shown in the drawing, occurs for technical reasons during manufacture, and if the length of the end area 25 or 26 is approximately 30 mm, for instance, the resultant change in diameter amounts to somewhat less than 0.1 mm. In the vicinity of the housing opening 27, there is an inlet funnel 28, the diameter of which is markedly increased as compared with that of the inner wall 24.

Figure 4:
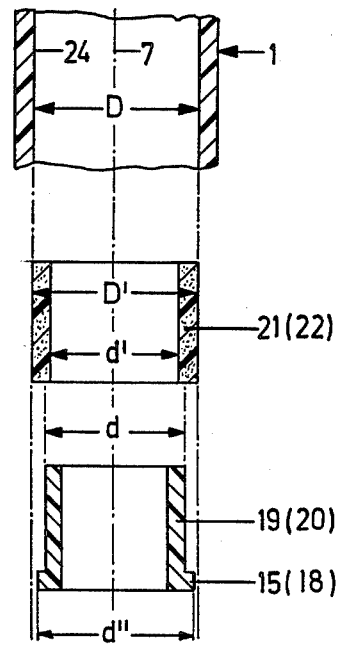
FIG. 4 shows a portion of the friction piston of the tappet and of the housing of the friction damper, in the dissassembled state in an expoded view.

As shown in FIG. 4, the housing 1 has an inside diameter D in the vicinity of the work area 23 and over its axial length; this diameter D is approximately equal to the outside diameter D' of one friction sleeve 21 or 22 in the relaxed, i.e. unassembled state. The outside diameter d of one seating face 19 or 20, contrarily, is somewhat larger than the inside diameter d' of this type of friction sleeve 21 or 22 in the unassembled state. Because of these differences in diameter, the friction sleeves 21, 22 are stretched elastically on their inside circumference, in fact by approximately 5 to 15%, when they are slipped over the seating faces 19 or 20. Because of this biasing on their inside, there is a certain amount of self-adjustment when wear occurs. The design and function of the tappet 2 having the friction piston 14 is known from U.S. patent application Ser. No. 187,186 now replaced without prejudice by Ser. No. 494,680. As also shown in FIG. 4, the outside diameter d" of the bracing flanges 15–18 is slightly smaller than the inside diameter D of the housing 1, so that the tappet 2 is guided in the housing 1 not by the bracing flanges 15–18, but rather by the friction sleeves 21, 22 that rest elastically against the inner wall 24.

A lubricant grease reservoir 29 in the form of an annular groove is provided between the middle two adjacent bracing flanges 16, 17.

The friction dampers are used primarily in washing machines with a spin cycle, that is which operate at subcritical rpm during the normal washing cycle. For spinning, the drums of the washing machines are accelerated to a considerably higher speed, for instance over 1000 rpm. On accelerating to this spin rpm, the vibrating system of the washing machine passes through the critical rpm level, at which the amplitudes of the vibrating system are at a maximum. Thus the greatest need for damping is during acceleration to this critical rpm. After passage through the critical rpm into higher rpm ranges, the need for damping decreases sharply once again. The increase in the vibration amplitudes of the vibrating system of the washing machine is due to the fact that the wet laundry in the washing machine drum represents a considerable imbalancing eccentricity, which accordingly leads to the fluctuations in vibration. On acceleration from the normal washing rpm to the spin rpm, both the vibration frequency of the friction damper and its vibration amplitude change; that is, the frictional work between the friction sleeves 21, 22 and the inner wall 24 of the housing 1 increases sharply. This in turn causes considerable heating of the housing 1, which in turn causes an increase in the inside diameter D. Conventional suitable plastics, such as homopolymers or polyacetal, have heat expansion coefficients on the order of magnitude of $1.1 \times 10^{-4}/°C$. Heat expansion coefficients on this order are approximately 9 times as high as the heat expansion coefficient of iron. If the inside diameter of the housing 1 is D=30 mm and the wall thickness of the housing is 2.5 mm, then the inside diameter D increases by approximately 0.3 mm if the temperature increases by 100° C.

The frictional work which is augmented by the acceleration does not lead to heating of the frictional piston 14 to the same extent, because during the vibrating movements of the tappet 2 the friction piston 14 is cooled on its inside to a relatively marked degree. Each time the tappet 2 plunges into the housing 1, air flows out through the vent opening 13, while each time the tappet 2 moves out of the housing 1 cool ambient air is aspirated into the tappet 2. The temperature level of the tappet 2 thus remains notably below that of the inner wall 24 of the housing 1. A further factor is that the outside diameter d of one seating face 19 or 20 is in any event less than the inside diameter D of the housing 1. Conversely, this frictional work that is augmented during acceleration does not lead to heating of the friction piston 14 to the same extent; that is, no comparable increase in the diameter of the seating faces 19, 20 occurs. As a result of these effects, i.e. significant enlargement of diameter D without significant enlargement of diameter D', the damping force decreases sharply at the end of the acceleration of the washing machine up to the spin rpm; in other words, a partial self-cancellation of the friction damping takes place. This effect is further reinforced by the fact that—as will have already been apparent from the above discussion—lubricated friction is applied; that is, a thin lubricating film of lubricant grease, stored in the lubricant grease reservoir 29 among other locations, is located between the friction sleeves 21, 22 and the inner wall 24 of the housing 1. The viscosity of this lubricating grease decreases as the temperature increases, which also contributes to lowering the frictional force and thus reducing the damping force. This last-mentioned effect is significant only as a reinforcement, however, rather than on its own.

Since the majority of the water has already been spun out of the wet laundry during acceleration to the spin rpm and just at the onset of spinning, the imbalancing force drops very sharply at the onset of spinning, so that the damping forces required also drop sharply. Although there must still be some damping force in the friction damper during spinning at the highly supercritical spin rpm, nevertheless this damping force can be markedly less than during normal damping in the subcritical range and especially less than during acceleration up to the spin rpm.

It has been found that with a friction damper embodied according to the present invention, having friction/-tension or pressure forces each of 100 N in the cold state at the end of the spin cycle, a residual damping force of approximately 40 N was still available. After cooling down, that is, after the reduction of the inside diameter D of the inner wall 24 to its initial dimension, the initial friction force mentioned at the outset above is again available.

The reciprocating movements between the tappet 2 and the housing 1 take place substantially in the vicinity of the work area 23.

Figure 2:
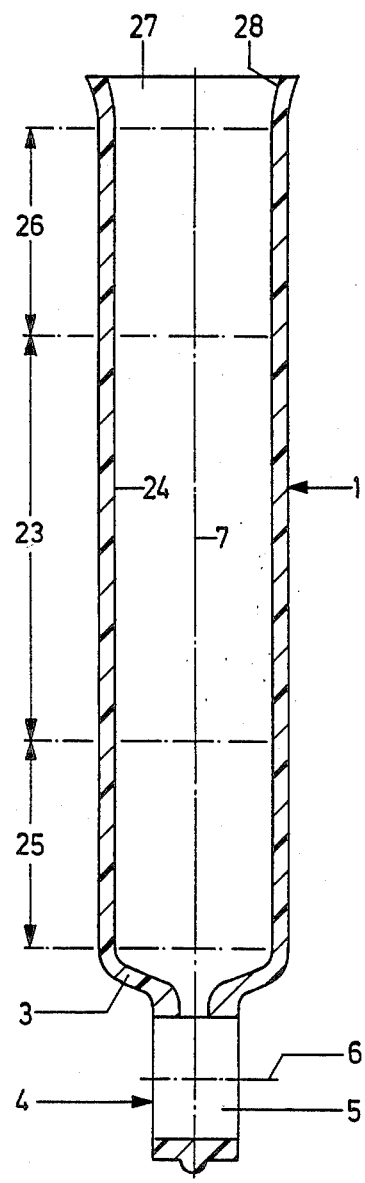
FIG. 2 shows the housing of the friction damper in a longitudinal section.
Figure 3:
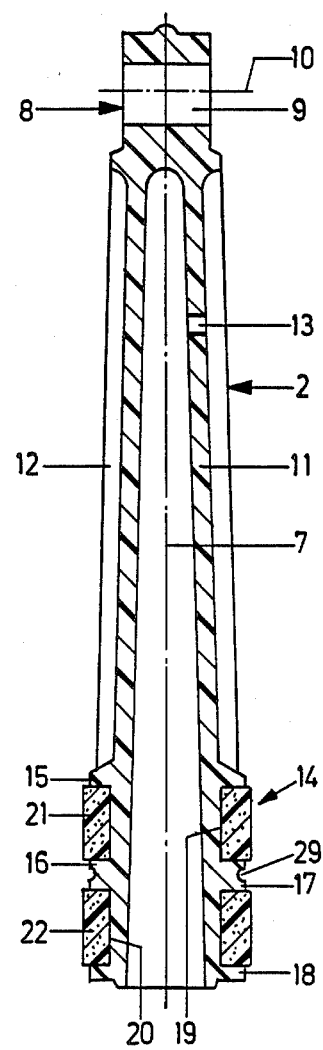
FIG. 3 shows the tappet of the friction damper in a longitudinal section.
Figure 5:
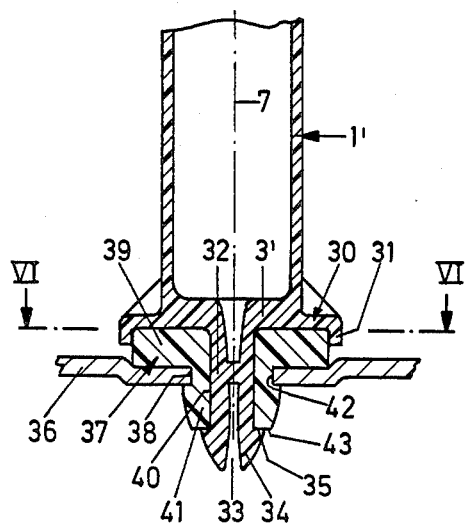
FIG. 5 is a fragmentary lontidudinal section through a housing having a modified securing element.
Figure 6:
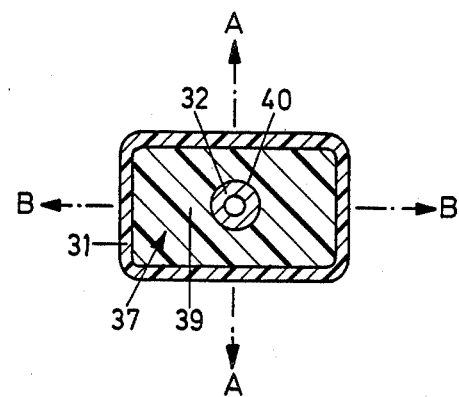
FIG. 6 is a cross section taken through the securing element along the line VI—VI of FIG. 5.

The embodiment of FIGS. 5 and 6 differs from that of FIGS. 1 and 2 only in terms of the structure of the lower securing element that is integrally formed with the housing 1'. Here the bottom 3' is embodied as an approximately rectangular flange 30 protruding beyond the housing 1' in at least one diametical direction and having a peripheral rim 31 that protrudes downward. Coaxially with the central longitudinal axis 7, a locking pin 32 is integrally provided with the housing 1' and the bottom 3' having the flange 30. On its end, this locking pin 32 is provided with a slit 33 extending crosswise through it in the longitudinal direction. In the vicinity of its free end, in the manner of an arrowhead 34, the locking pin 32 is provided with barb-like recoiling locking faces 35.

To secure the friction damper to a bottom plate 36 of a washing machine that is not otherwise shown, an elastic bearing, made for instance of rubber, is provided, which is pushed through an opening 38 in the bottom plate 36 and held elastically therein. This elastic bearing 37 has an elastic seating plate 39, the outer circumference of which corresponds to the course of the inside of the rim 31. This plate 39 is provided with a continuous conduit-like opening 40 adapted to the locking pin 32 and through which the locking pin 32 is pushed. In this process, the arrowheads 34 are elastically deformed toward each other; this is readily permitted by the slit 33. After the locking pin 32 has been pushed all the way through the opening 40, the arrowheads 34 recoil elastically to their original position, so that the locking faces 35 press from below against the elastic bearing. One effect of this is that the friction damper is firmly joined to the elastic bearing 37. The bearing 37 in turn can no longer be loosened from the bottom plate 36, because the elastic bearing 37 has a mushroom-shaped portion 41 penetrated by the conduit-like opening 40 extends and having an annular recess 42, corresponding to the opening 38 in the bottom plate 36, immediately adjacent to the seating plate 39. The mushroom-shaped portion 41 itself is located below this recess 42 and its outer diameter is larger than the diameter of the opening 38. The portion 41 tapers toward its free end, where a seating face 43 is formed for the locking faces 35 of the arrowheads. In this area, the diameter of the portion 41 is approximately equal to that of the opening 38, so that—before the friction damper is assembled—the elastic bearing 37 can be pushed into the opening 38 in the same way, like a button into a hole.

Thus, assembly of the friction damper requires merely the insertion of the elastic bearing 37 into the bottom plate 36 and the ensuing insertion of the locking pin 32 into the conduit-like opening 40.

Because of the rectangular embodiment of the flange 30 and elastic bearing 37, the rigidity of the elastic means for securing the friction damper to the bottom plate 36 in the direction indicated by line A—A, that is, in the direction of the short axis, is less than in the direction B—B, that is, in the direction of the long axis. In drum-type washing machine where the washing unit is supported in a freely vibrating manner, if the direction B—B is oriented parallel to the drum axis of the washing machine and the direction A—A is oriented at right angles to it then so-called pitching oscillations of the washing unit in the direction of the drum axis are effectively suppressed. This effect is known per se from British Patent 1 187 269.

Figure 7:
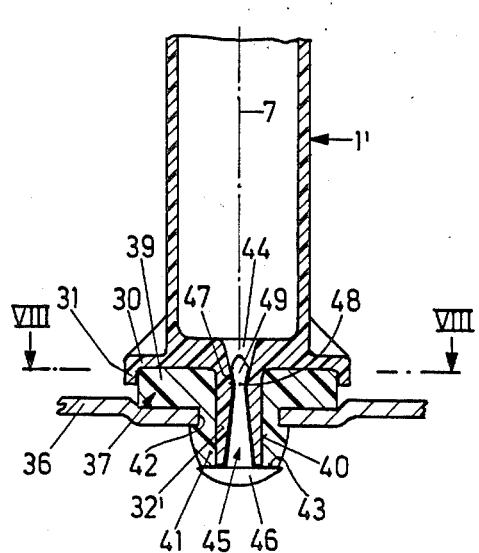
FIG. 7 is a fragmentary longitudinal section through the housing having a further modified securing element.
Figure 8:
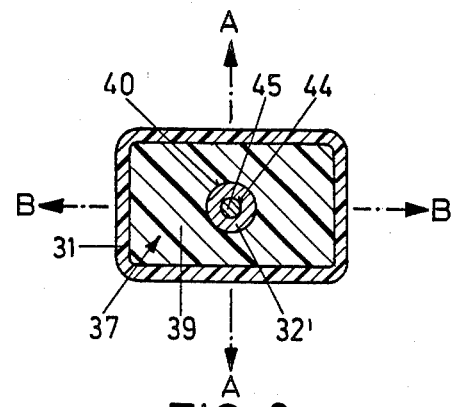
FIG. 8 is a cross section taken through the securing element along the line VIII—VIII of FIG. 7.

The embodiment shown in FIGS. 7 and 8 differs from that of FIGS. 5 and 6 substantially only in that the locking pin 32' is not embodied like an arrowhead on its free end, but instead has a through opening 44, into which a retaining pin 45 is pushed in like a nail, the head 46 of which overlaps the seating face 43 of the mushroom-shaped portion 41 of the elastic bearing 37. To assure that this retaining pin 45 will hold in the opening 44, this opening is embodied somewhat like a venturi nozzle; that is, it has a throat 47 approximately in the vicinity of the flange 30 and from there widens very slightly conically toward its free end. The retaining pin 45 tapers correspondingly in from its head 46, and then has a wider portion 49 adjacent to its restriction 48 associated with the throat 47 of the opening 44.

After the locking pin 32' is inserted into the conduit-like opening 40 of the elastic bearing 37, the retaining pin 45 is pushed from below into the opening 44 until its locks elastically into place. Since—as already noted above—the housing 1 or 1' together with its securing element is made of hard elastic plastic, this type of elastic locking is easy to fabricate and is durable.

To assure that the elastic bearing 37 has a defined position with respect to the bottom plate 36, the bottom plate has an indentation that is adapted to the outer circumference of the seating plate 39.

Instead of the eye 8 formed on the tappet 2, a securing element may also be attached there, as shown in FIGS. 5, 6 or 7, 8 and as described above.

It will be obvious to those skilled in the art that various changes may be made without departing from the scope of the invention and the invention is not considered limited to what is shown in the drawings and described in the specification.

What is claimed is:

1. A friction damper, for a washing machine with a spin cycle, consisting of a housing (1, 1') having a substantially circular cylindrical inner wall (24) with a diameter D, and tappet (2) having a hole extending therethrough, said tappet being insertable coaxially into and extending with one end out of the housing (1, 1') and provided on its other end with a friction piston (14), wherein the friction piston (14) is provided with a friction element of elastic foamed material with closed pores pressed elastically against the inner wall (24) of the housing (1, 1'), said friction piston being made in one piece with at least one pair of bracing flanges, a circular seating surface being located between the at least one pair of bracing flanges, said seating surface receiving and holding said friction element, and wherein securing elements are formed on the respective free ends of the tappet and housing, characterized in that the housing (1, 1') is molded in one piece of plastic and has a wall thickness of 2.0–3.0 mm, said plastic being a homopolymer or a polyacetal having a heat expansion coefficient on the order of magnitude of $1.1 \times 10^{-4}/°C.$, said plastic housing constituting friction reducing means for reducing friction between said friction element and said inner wall when the washing machine reaches a spin rpm by generating substantial heat from vibration due to friction during passage from a wash rpm to the spin rpm, the heat so generated causing a significant increase in the diameter D of said housing, the hole extending through said tappet comprising cooling means for cooling said friction piston by the flow of cooling air through said tappet so as to prevent heating of said friction piston and significant enlargement of the diameter of said friction piston.

2. A friction damper in accordance with claim 1, characterized in that the housing (1, 1') including the securing element (eye 4; flange 30 with locking pin 32, 32') is embodied in one piece.

3. A friction damper in accordance with claim 2, characterized in that the securing element has a flange (30) and a locking pin (32, 32') protruding from it, to provide a plug connection with an elastic bearing (37).

4. A friction damper in accordance with claim 3, characterized in that the locking pin (32) has a head in the manner of arrowheads (34), which overlap the elastic bearing (37).

5. A friction damper in accordance with claim 3, characterized in that the locking pin (32') has an opening (44) for receiving a retaining pin (45), the head (46) of which presses against the elastic bearing (37).

6. A friction damper in accordance with claim 5, characterized in that the opening (44) in the locking pin (32) has a throat (47), and the retaining pin (45) has a corresponding restriction (48), for elastic locking of the retaining pin (45) in the locking pin (32').

7. A friction damper in accordance with claim 1, characterized in that the wall thickness of the housing (1, 1') amounts to approximately 2.5 mm.

8. A friction damper in accordance with claim 1, characterized in that the housing (1, 1') is made of a said homopolymer.

9. A friction damper in accordance with claim 1, characterized in that the housing (1, 1') is made of a said polyacetal.

* * * * *